US008014398B2

(12) United States Patent
Tajima et al.

(10) Patent No.: US 8,014,398 B2
(45) Date of Patent: Sep. 6, 2011

(54) METHOD AND APPARATUS FOR MANAGING DELIVERY OF STREAM DATA

(75) Inventors: Satoshi Tajima, Kawasaki (JP); Tomonori Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 877 days.

(21) Appl. No.: 11/442,956

(22) Filed: May 31, 2006

(65) Prior Publication Data
US 2007/0165639 A1 Jul. 19, 2007

(30) Foreign Application Priority Data

Jan. 19, 2006 (JP) .................................. 2006-011562

(51) Int. Cl.
*H04L 12/28* (2006.01)
*G06F 15/16* (2006.01)

(52) U.S. Cl. ........ 370/392; 370/218; 370/235; 370/352; 370/401; 709/221; 709/223; 709/229; 709/230; 709/231

(58) Field of Classification Search .......... 370/244–503; 709/203–242
See application file for complete search history.

(56) References Cited

U.S. PATENT DOCUMENTS

| 5,202,985 | A  | * | 4/1993  | Goyal           | 709/218 |
|-----------|----|---|---------|-----------------|---------|
| 6,278,995 | B1 | * | 8/2001  | Hawkinson       | 707/4   |
| 6,308,216 | B1 | * | 10/2001 | Goldszmidt et al. | 709/236 |
| 6,343,313 | B1 | * | 1/2002  | Salesky et al.  | 709/204 |
| 6,349,310 | B1 | * | 2/2002  | Klein et al.    | 707/703 |
| 6,453,356 | B1 | * | 9/2002  | Sheard et al.   | 709/231 |
| 6,606,660 | B1 | * | 8/2003  | Bowman-Amuah    | 709/227 |
| 6,611,872 | B1 | * | 8/2003  | McCanne         | 709/238 |
| 6,826,190 | B1 | * | 11/2004 | Petri           | 370/400 |
| 6,850,584 | B2 | * | 2/2005  | Kogure et al.   | 375/376 |

(Continued)

FOREIGN PATENT DOCUMENTS

JP  2004-38788  2/2004

OTHER PUBLICATIONS

Japanese Office Action issued Aug. 24, 2010 in corresponding Japanese Patent Application 2006-011562.

(Continued)

*Primary Examiner* — Ayaz Sheikh
*Assistant Examiner* — Venkatesh Haliyur
(74) *Attorney, Agent, or Firm* — Staas & Halsey LLP

(57) ABSTRACT

This invention is to cope with users requesting the delivery of stream data, flexibly. In this invention, a user terminal requesting the delivery of the stream data is used as a node in a delivery tree whose root is a delivery source device connected to a camera, and relays the stream data to a lower stage. This delivery tree is managed by a delivery management server. Then, it executes: receiving a delivery request of specific stream data; identifying an apparatus whose number of stages from the root of the delivery tree is the least and having a remaining relay resource with reference to a delivery management database storing the number of stages from the root of the delivery tree, data representing a remaining relay resource and access destination data for each of apparatuses including a root device of the delivery tree and terminals as nodes in the delivery tree; and reading out the access destination data of the identified apparatus from the delivery management database, and transmitting the read access destination data as request destination data of the specific stream data to the delivery requesting terminal.

4 Claims, 13 Drawing Sheets

U.S. PATENT DOCUMENTS

| | | | |
|---|---|---|---|
| 6,857,012 B2* | 2/2005 | Sim et al. | 709/222 |
| 6,914,907 B1* | 7/2005 | Bhardwaj et al. | 370/432 |
| 6,970,939 B2* | 11/2005 | Sim | 709/236 |
| 7,047,287 B2* | 5/2006 | Sim et al. | 709/221 |
| 7,058,014 B2* | 6/2006 | Sim | 370/230 |
| 7,072,954 B1* | 7/2006 | Ezaki et al. | 709/223 |
| 7,139,844 B2* | 11/2006 | Smith et al. | 709/250 |
| 7,165,095 B2* | 1/2007 | Sim | 709/217 |
| 7,177,270 B2* | 2/2007 | Sim et al. | 370/229 |
| 7,181,523 B2* | 2/2007 | Sim | 709/226 |
| 7,188,308 B2* | 3/2007 | Weise et al. | 715/273 |
| 7,212,634 B2* | 5/2007 | Briscoe | 380/203 |
| 7,281,260 B2* | 10/2007 | Puente et al. | 725/110 |
| 7,313,596 B2* | 12/2007 | Tani et al. | 709/205 |
| 7,437,354 B2* | 10/2008 | Venkatachary et al. | 1/1 |
| 7,508,753 B2* | 3/2009 | Greenspan et al. | 370/218 |
| 7,562,292 B2* | 7/2009 | Mashni et al. | 715/234 |
| 7,631,255 B2* | 12/2009 | Weise et al. | 715/229 |
| 7,676,601 B2* | 3/2010 | Smith et al. | 709/250 |
| 2001/0042110 A1* | 11/2001 | Furusawa et al. | 709/219 |
| 2002/0016839 A1* | 2/2002 | Smith et al. | 709/224 |
| 2002/0046043 A1* | 4/2002 | Smith et al. | 705/1 |
| 2002/0056004 A1* | 5/2002 | Smith et al. | 709/227 |
| 2002/0078174 A1* | 6/2002 | Sim et al. | 709/219 |
| 2002/0083118 A1* | 6/2002 | Sim | 709/105 |
| 2002/0083187 A1* | 6/2002 | Sim et al. | 709/235 |
| 2002/0112069 A1* | 8/2002 | Sim | 709/236 |
| 2002/0138842 A1* | 9/2002 | Chong et al. | 725/87 |
| 2003/0026254 A1* | 2/2003 | Sim | 370/392 |
| 2003/0031176 A1* | 2/2003 | Sim | 370/392 |
| 2003/0046369 A1* | 3/2003 | Sim et al. | 709/220 |
| 2003/0193994 A1* | 10/2003 | Stickler | 375/150 |
| 2004/0107277 A1* | 6/2004 | Levesque et al. | 709/223 |
| 2004/0205638 A1* | 10/2004 | Thomas et al. | 715/526 |
| 2004/0230659 A1* | 11/2004 | Chase | 709/206 |
| 2004/0243938 A1* | 12/2004 | Weise et al. | 715/526 |
| 2005/0018678 A1* | 1/2005 | Keller et al. | 370/390 |
| 2005/0160070 A1* | 7/2005 | Mashni et al. | 707/1 |
| 2005/0198238 A1* | 9/2005 | Sim et al. | 709/222 |
| 2005/0254429 A1 | 11/2005 | Kato et al. | |
| 2006/0015624 A1* | 1/2006 | Smith et al. | 709/227 |
| 2006/0235714 A1* | 10/2006 | Adinolfi et al. | 705/1 |
| 2006/0235715 A1* | 10/2006 | Abrams et al. | 705/1 |
| 2006/0235831 A1* | 10/2006 | Adinolfi et al. | 707/3 |
| 2006/0242311 A1* | 10/2006 | Mai et al. | 709/229 |
| 2006/0247944 A1* | 11/2006 | Calusinski et al. | 705/1 |

OTHER PUBLICATIONS

Japanese Office Action issued Apr. 26, 2011 in corresponding Japanese Patent Application 2006-011562.

* cited by examiner

| DEVICE ID | VIDEO ID | NO. OF GENERATIONS | IP ADDRESS | DELIVERY PORT | UPPER LIMIT NO. OF DELIVERIES | NO. OF DELIVERIES | DELIVERY SOURCE ID |
|---|---|---|---|---|---|---|---|
| ENC1 | 1 | 0 | 192.168.1.11 | 9900 | 2 | 2 | — |
| CELL01 | 1 | 1 | 192.168.1.101 | 9900 | 4 | 2 | ENC1 |
| CELL02 | 1 | 1 | 192.168.1.102 | 9900 | 4 | 1 | ENC1 |
| CELL03 | 1 | 2 | 192.168.1.103 | 9900 | 2 | 2 | CELL01 |
| CELL04 | 1 | 2 | 192.168.1.104 | 9900 | 2 | 1 | CELL01 |
| CELL11 | 1 | 2 | 192.168.1.111 | 9900 | 2 | 0 | CELL02 |
| ... | ... | ... | ... | ... | ... | ... | ... |
| ENC2 | 2 | 0 | 192.168.1.12 | 9900 | 4 | 4 | — |
| CELL21 | 2 | 1 | 192.168.1.201 | 9900 | 2 | | ENC2 |
| CELL22 | 2 | 1 | 192.168.1.202 | 9900 | 2 | | ENC2 |
| CELL23 | 2 | 1 | 192.168.1.203 | 9900 | 2 | | ENC2 |
| CELL24 | 2 | 1 | 192.168.1.204 | 9900 | 2 | | ENC2 |
| CELL31 | 2 | 2 | 192.168.1.211 | 9900 | 2 | | CELL21 |
| CELL32 | 2 | 2 | 192.168.1.212 | 9900 | 2 | | CELL21 |
| CELL101 | 2 | 3 | 192.168.1.231 | 9900 | 2 | | CELL31 |
| ... | ... | ... | ... | ... | ... | ... | ... |
| ENC3 | 3 | 0 | 192.168.1.13 | 9900 | 3 | 2 | — |
| ... | ... | ... | ... | ... | ... | ... | ... |

FIG.10

METHOD AND APPARATUS FOR MANAGING DELIVERY OF STREAM DATA

TECHNICAL FIELD OF THE INVENTION

The present invention relates to a stream data delivery technique.

BACKGROUND OF THE INVENTION

Video data has come to be often delivered in real time as stream data, as the Internet and high speed communication services such as Asymmetric Digital Subscriber Line (ADSL) and Fiber To The Home (FTTH) infiltrate. However, it is not so easy to simultaneously deliver the stream data to a lot of clients. Normally, either a method of preparing a few large-scale servers or a method of preparing a lot of servers is adopted. However, they increase the cost of facilities or operations. In addition, it is necessary to process the video and voice in real time, and when a lot of clients are connected, it is very difficult to maintain the real-time delivery. For example, when a configuration where a lot of servers are connected to a lot of clients via a load distribution apparatus is adopted, the delay occurs at the load distribution apparatus anyway, and it is difficult to maintain the real-time delivery. Moreover, when a configuration where one server, for example, is connected with clients via a proxy, although the smooth video and voice can be delivered by the cache of the proxy to a lot of clients, the real-time delivery cannot be carried out by the cache. Furthermore, even if all the facilities are not used actually, the redundant design of the maximum configuration is required at the design. Therefore, when introducing the system, the tremendous cost is required. In addition, the expansion of the system is not easy.

In addition, for example, US-2001/042110-A1 discloses a technique to reduce the load of a parent server and/or a network connected to the parent server in a delivery system delivering contents to a plurality of clients, and to reduce the burden of an administrator and users of the delivery system by automatically switching delivery servers according to varying delivery requests. Specifically, in a delivery system having the parent server and a plurality of child servers and configured so that they can be connected with a plurality of clients via communication lines, the parent server selects a child server having contents requested to be delivered and being nearest the client of the delivery requesting source based on received position information of the client and identification information of the contents to notify the client of the delivery requesting source. Then, the selected child server responds to the request of the client of the delivery requesting source and delivers the contents requested to be delivered. However, the child servers are provided fixedly, and when clients whose number exceeds the permissible number requests the delivery, the expansion of the child servers is needed.

SUMMARY OF THE INVENTION

Thus, the conventional systems delivering the stream data lack the flexibility as the system, and they have a problem that the cost becomes expensive.

Therefore, an object of the present invention is to provide a technique for coping with clients requesting the delivery of the stream data, flexibly and cheaply.

In addition, another object of the present invention is to provide a technique for coping with the clients requesting the delivery of the stream data without losing the real-time delivery.

In the present invention, terminals of clients requesting the delivery of the stream data are used as nodes of a delivery tree whose root is a delivery source apparatus, and each terminal of the client relays the stream data to a lower layer (stage or generation). Such a delivery tree is managed by a delivery management server.

Therefore, a stream data delivery management method according to the present invention includes: receiving a delivery request for delivery of specific stream data from a delivery requesting terminal; identifying an apparatus whose number of stages from a root of a delivery tree of specific stream data (number of layers or number of generations) is the least and having a remaining relay resource with reference to a delivery management database storing the number of stages from the root of the delivery tree, data representing a remaining relay resource and access destination data for each of apparatuses including a root device of the delivery tree and terminals as nodes in the delivery tree; reading out the access destination data of the identified apparatus from the delivery management database, and transmitting the read access destination data as request destination data of the specific stream data to the delivery requesting terminal; and updating the delivery management database so as to reflect a state where the specific stream data is being delivered to the delivery requesting terminal.

By managing the delivery tree in this way, even if the number of delivery requesting terminals increases, the present invention can cope with the increase flexibly. In addition, because the delivery management server is not incorporated into the delivery tree and the delivery tree is composed of the client terminals except for the delivery source apparatus, the system can be constructed cheaply.

Moreover, the aforementioned updating may include: registering data concerning the delivery requesting terminal into the delivery management database; and updating the data representing the remaining relay resource of the identified apparatus in the delivery management database. This enables the appropriate management of the delivery management database.

Furthermore, the aforementioned data concerning the delivery requesting terminal may include a value calculated by incrementing the number of stages of the identified apparatus by one as the number of stages of the apparatus, the permissible number of delivery destinations and the number of delivering destinations of the delivery requesting terminal as the data representing the remaining relay resource of the apparatus, an IP address and port number of the delivery requesting terminal as the access destination data of the apparatus, and identification information of the identified apparatus as delivery source data of the delivery requesting terminal. This enables the appropriate processing when the delivery requesting terminal relays the stream data and further when the delivery requesting terminal leaves from the delivery tree.

In addition, the delivery management database may store identification information of a delivery source apparatus for each terminal. In such a case, the stream data delivery management method may further include: receiving a delivery stop request from a specific terminal as a node in the delivery tree of the specific stream data; detecting a first apparatus whose delivery source apparatus is the specific terminal with reference to the delivery management database; upon the detection of the first apparatus, searching the delivery management database while assuming a state where the specific terminal does not belong to the delivery tree to identify a second apparatus whose number of stages is the least and having the remaining relay resource; reading out the access destination data of the second apparatus, and transmitting the read access destination data as new request destination data of the specific stream data to the first apparatus; and updating the delivery management database so as to reflect a state where the specific stream data is being delivered from the second apparatus to the first apparatus.

Thus, even if the specific terminal leaves from the delivery tree, it is possible not to influence other terminals to which the stream data was delivered from the specific terminal.

Incidentally, it is possible to create a program for causing a computer to execute this stream data delivery management method according to the present invention. The program is stored into a storage medium or a storage device such as, for example, a flexible disk, a CD-ROM, a magneto-optical disk, a semiconductor memory, or a hard disk. Data under processing is temporarily stored in the storage device such as a computer memory.

BRIEF DESCRIPTION OF THE DRAWINGS

FIG. 10 is a diagram showing an example of data stored in a delivery management DB;

DETAILED DESCRIPTION OF THE PREFERRED EMBODIMENTS

Figure 1:
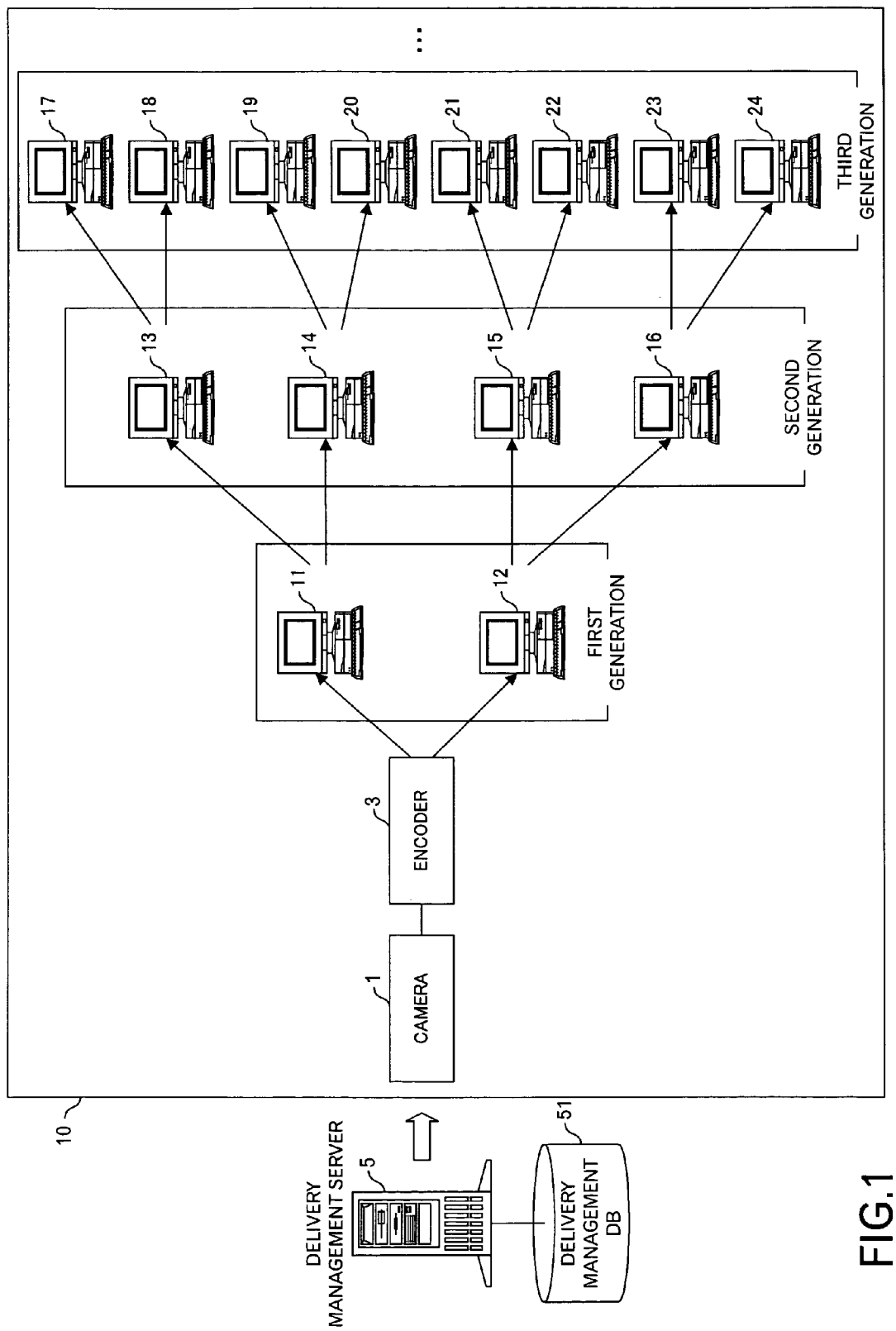
FIG. 1 is a diagram to explain a system outline relating to an embodiment of the present invention.

An outline of a system according to an embodiment of the present invention will be described with reference to FIG. 1. A network such as the Internet is connected to an encoder 3, which is connected to a camera 1 taking video or the like and which generates stream data in a format following a standard such as MPEG, a lot of terminals 11 to 24 used by clients, and a delivery management server 5 that manages and controls the delivery of the stream data. The delivery management server 5 determines mutual connection relation among the encoder 3 and the terminals 11 to 24 based on data stored in a delivery management DB 51 to configure a delivery tree 10. In an example of FIG. 1, when the 0-th generation (also called the 0-th layer or the 0-th stage) in the delivery tree 10 is the encoder 3, the first generation (the first layer or the first stage) is composed of the terminals 11 and 12, the second generation (the second layer or the second stage) is composed of the terminals 13 to 16, and the third generation (the third layer or the third stage) is composed of the terminals 17 to 24. Specifically, the terminals 11 and 12 are connected to the encoder 3, the terminals 13 and 14 are connected to the terminal 11, the terminals 15 and 16 are connected to the terminal 12, the terminals 17 and 18 are connected to the terminal 13, the terminals 19 and 20 are connected to the terminal 14, the terminals 21 and 22 are connected to the terminal 15, and the terminals 23 and 24 are connected to the terminal 16. Although it is described below, the number of terminals for each generation is determined according to the capability of each terminal or the like.

Figure 2:
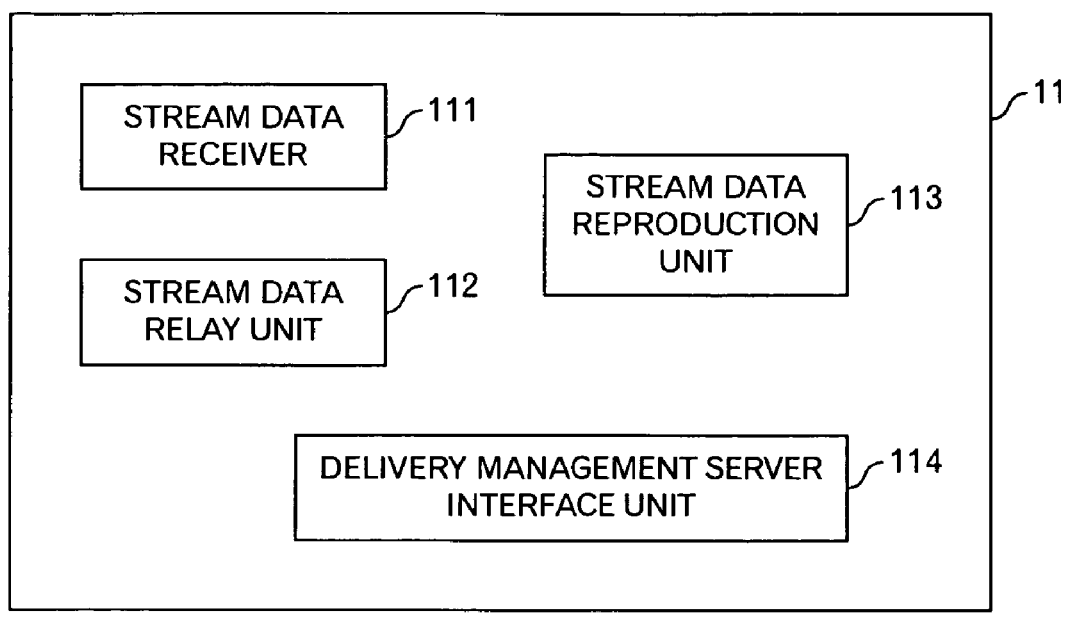
FIG. 2 is a functional block diagram of a terminal.

FIG. 2 shows a functional block diagram of the terminals 11 to 24. The terminals 11 to 24 respectively have a stream data receiver 111 that receives the stream data from an upper generation of the delivery tree 10, a stream data relay unit 112 that relays the stream data to a lower generation of the delivery tree 10, a stream data reproduction unit 113 that decodes the stream data received by the stream data receiver 111, and reproduces and outputs the decoded stream data to a display device, and a delivery management server interface unit 114 that carries out processings to transmit a delivery request or a delete notice (also called a delivery stop request or a receipt stop request) to the delivery management server 5 according to an instruction from the user or the like, and to receive a connection notice or a delete allowance notice from the delivery management server 5.

Figure 3:
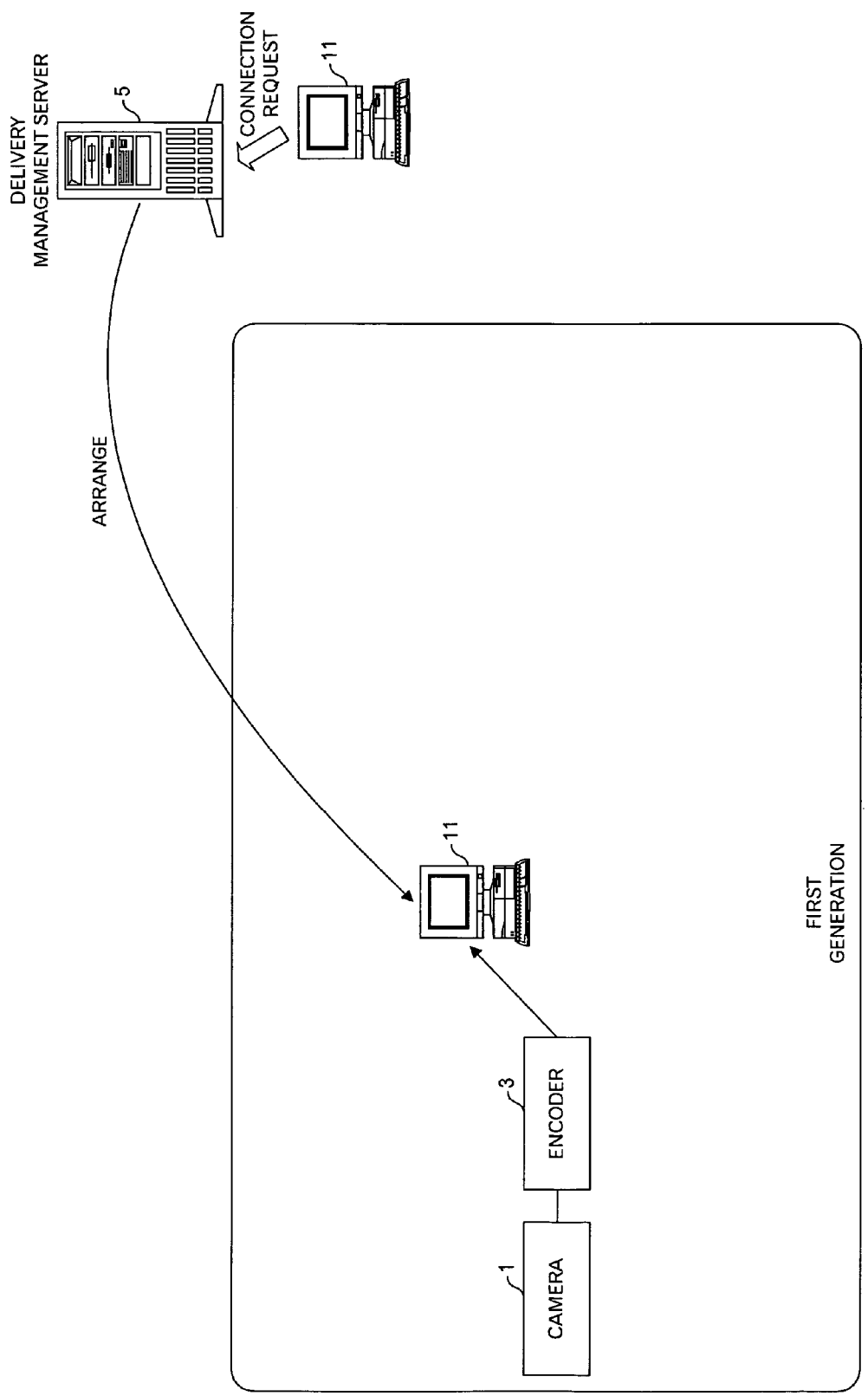
FIG. 3 is a diagram to explain a construction processing of a delivery tree when receiving a delivery request from a terminal.
Figure 4:
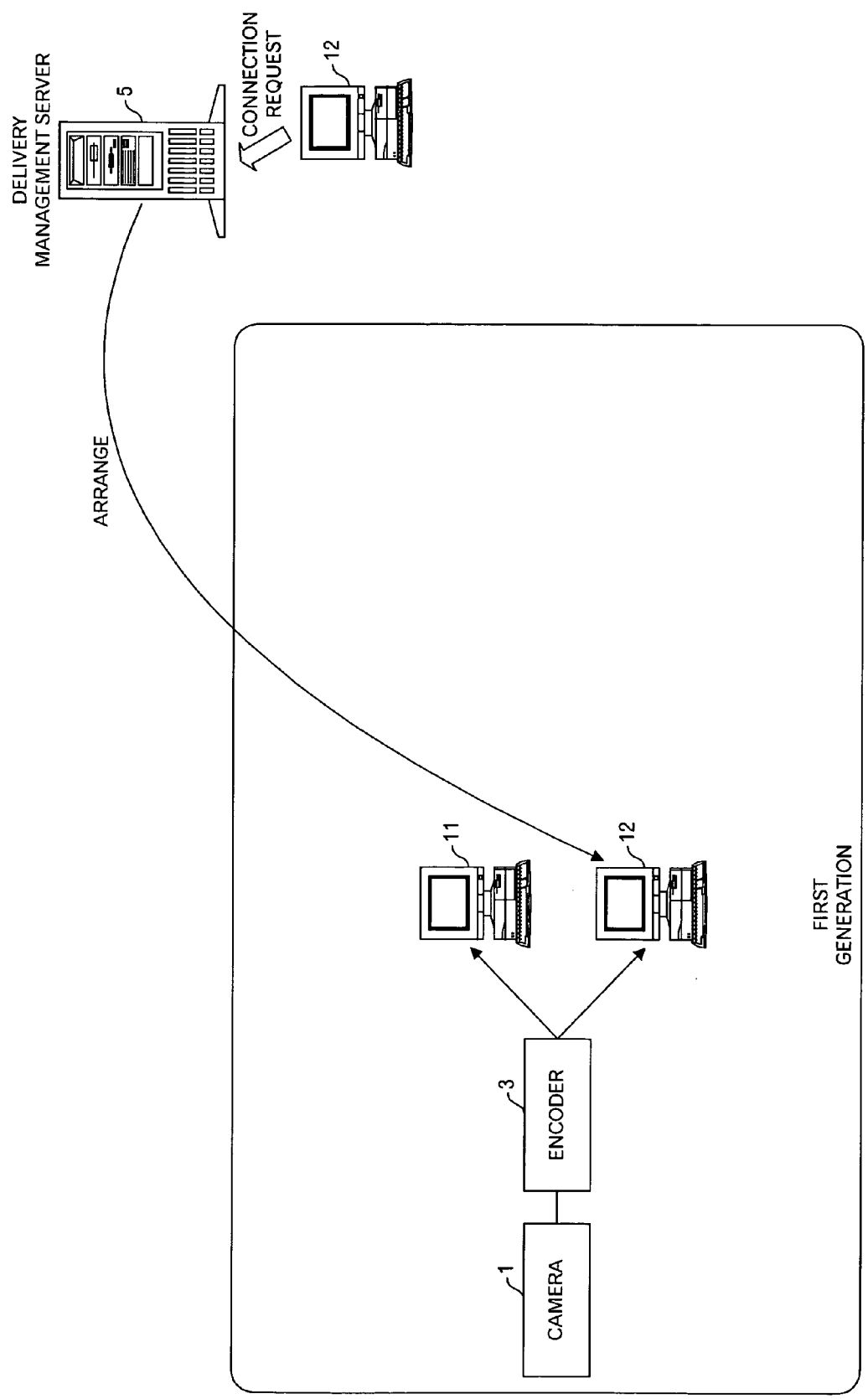
FIG. 4 is a diagram to explain the construction processing of the delivery tree when receiving the delivery request from the terminal.
Figure 5:
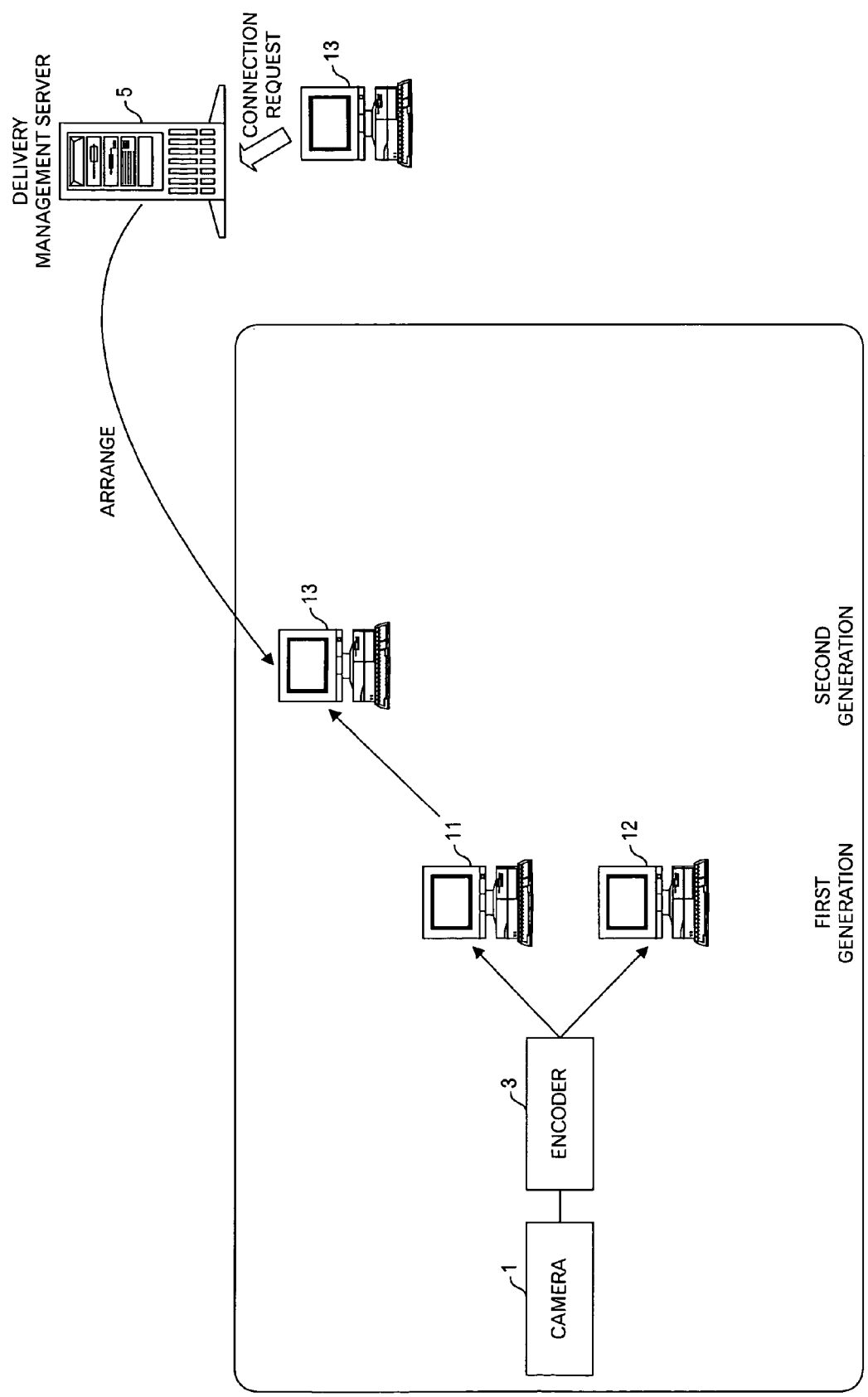
FIG. 5 is a diagram to explain the construction processing of the delivery tree when receiving the delivery request from the terminal.

Next, an outline of a processing when constructing the delivery tree 10 as shown in FIG. 1 will be described with reference to FIG. 3 to FIG. 6. In a state where the encoder 3 is not still connected to any terminal, as shown in FIG. 3, when the terminal 11 transmits a connection request (also called a delivery request) to the delivery management server 5, the delivery management server 5 transmits a connection notice including an IP address and port number of the encoder 3 in order to connect the terminal 11 as the first generation terminal to the encoder 3. The terminal 11 receives the stream data from the encoder 3 according to the connection notice, and reproduces it. Next, as shown in FIG. 4, when the terminal 12 transmits a connection request to the delivery management server 5, the delivery management server 5 transmits a connection notice including the IP address and port number of the encoder 3 in order to connect the terminal 12 as the first generation terminal to the encoder 3. The terminal 12 receives the stream data from the encoder 3 according to the connection notice, and reproduces it. Incidentally, when assuming that the permissible number of delivery destinations of the encoder 3 is "2", the encoder 3 cannot directly deliver the stream data to more terminals.

Figure 6:
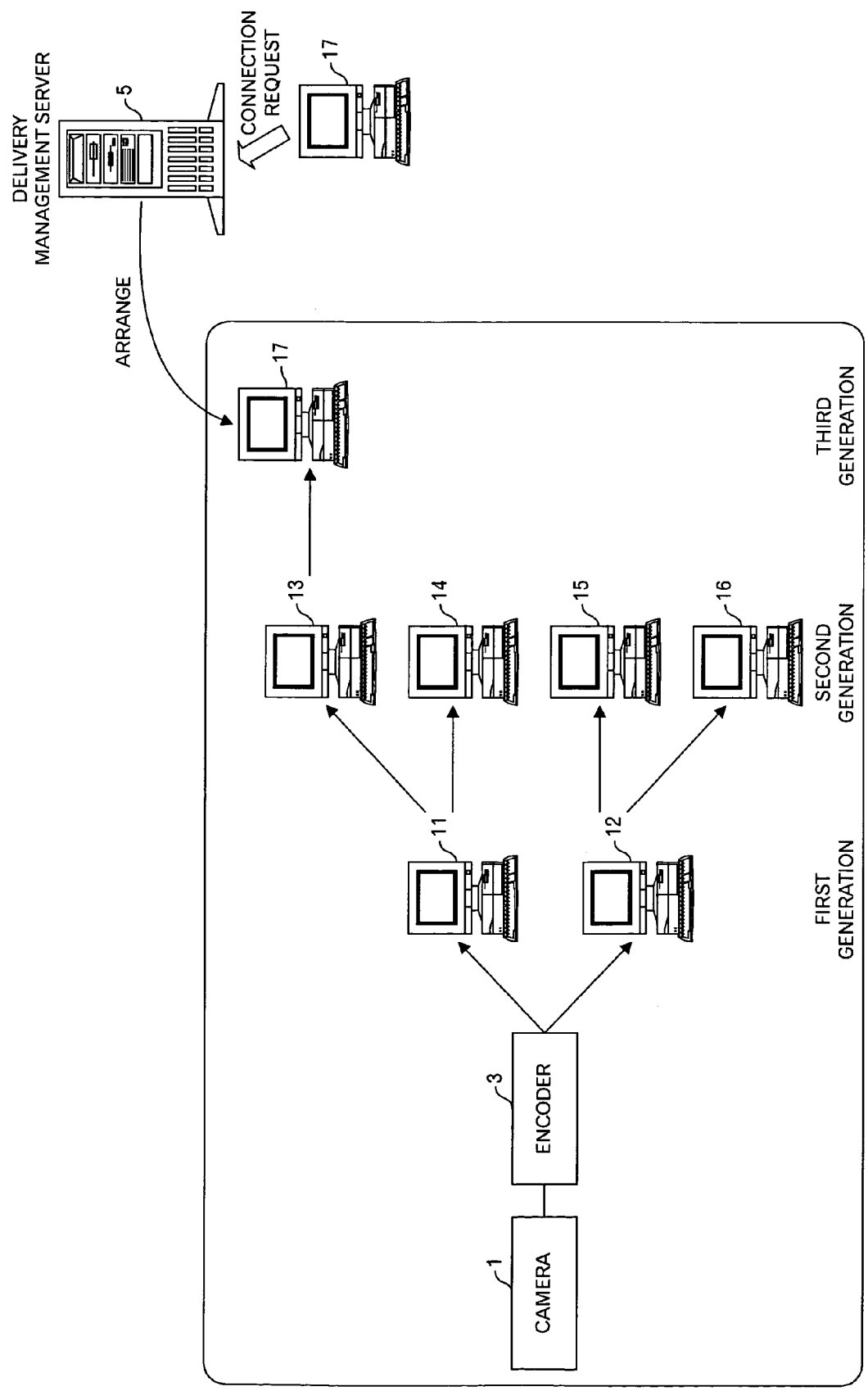
FIG. 6 is a diagram to explain the construction processing of the delivery tree when receiving the delivery request from the terminal.

Furthermore, when the terminal 13 transmits a connection request to the delivery management server 5, the delivery management server 5 transmits a connection notice including an IP address and port number of the terminal 11 in order to connect the terminal 13 as the second generation terminal to the terminal 11. The terminal 13 receives the stream data from the terminal 11 according to the connection notice, and reproduces it. In a case where the permissible number of delivery destinations of each terminal of the first generation is "2", when such a processing is repeated and the terminals 13 to 16 are connected as the second generation terminals to the terminals 11 and 12 of the first generation, the number of terminals of the second generation cannot be increased any more. Therefore, as shown in FIG. 6, when the terminal 17 transmits a connection request to the delivery management server 5, the delivery management server 5 transmits a connection notice including an IP address and port number of the terminal 13 in order to connect the terminal 17 as the third generation terminal to the terminal 13. The terminal 17 receives the stream data from the terminal 13 according to the connection notice, and reproduces it.

In this way, because the delivery management server 5 is not included in the delivery tree 10, the load state of the delivery management server 5 is not greatly influenced from the delivery of the stream data. In addition, although it is necessary to introduce the function as shown in FIG. 2, it is possible to construct the delivery system cheaply, because the terminals of the clients are installed into the delivery tree 10. Moreover, as described above, by increasing the number of generations (layers or stages) of the delivery tree 10, it is possible to easily expand the delivery system. Therefore, the entire system has flexibility. Furthermore, by appropriately setting the permissible number of delivery destinations according to the capability of the terminals, it is possible to prevent each terminal from being in a high load state and to relay the stream data without losing the real-time delivery.

Figure 7:
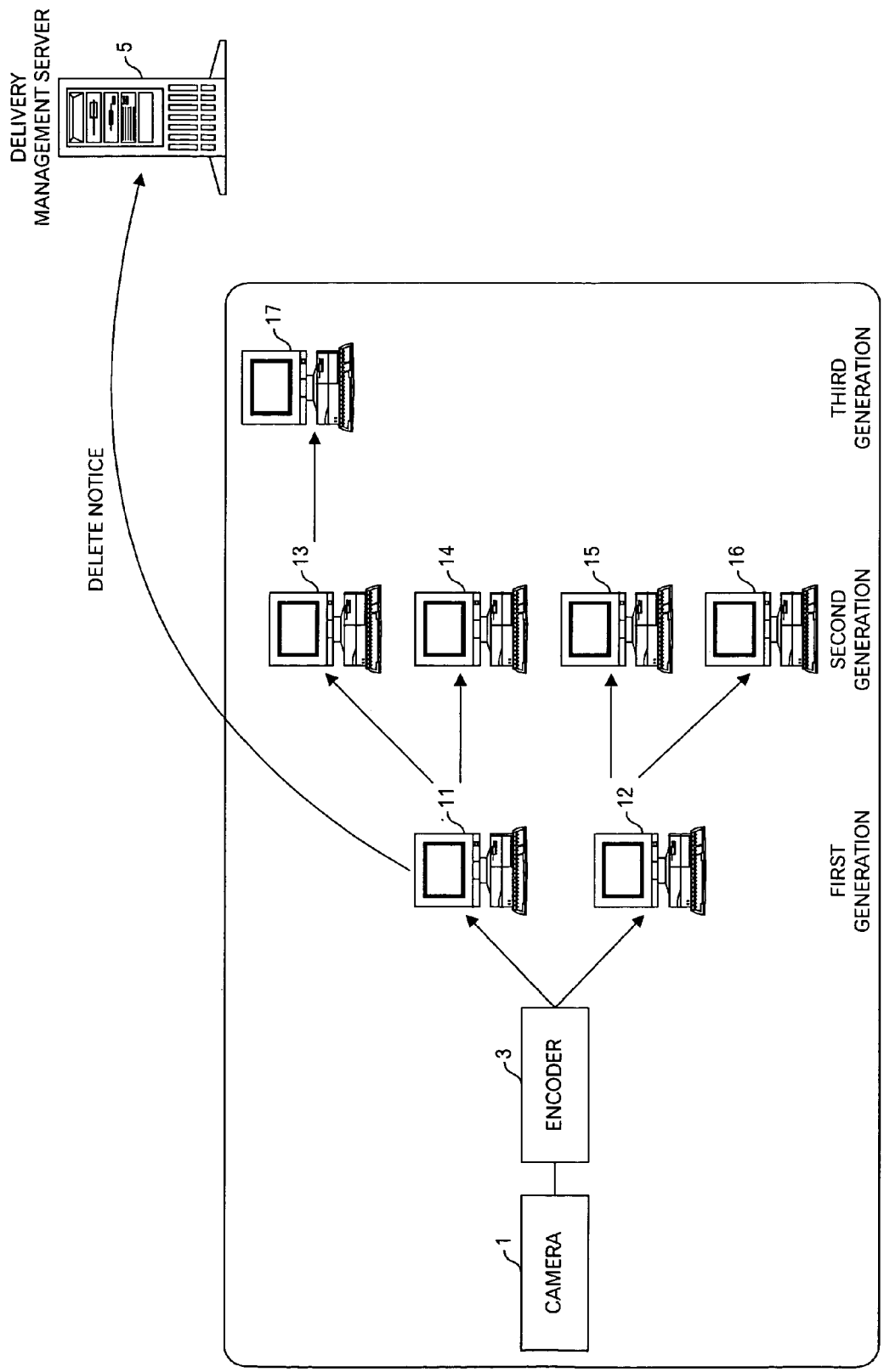
FIG. 7 is a diagram to explain a reconstruction processing of the delivery tree when receiving a delete notice from a terminal.
Figure 8:
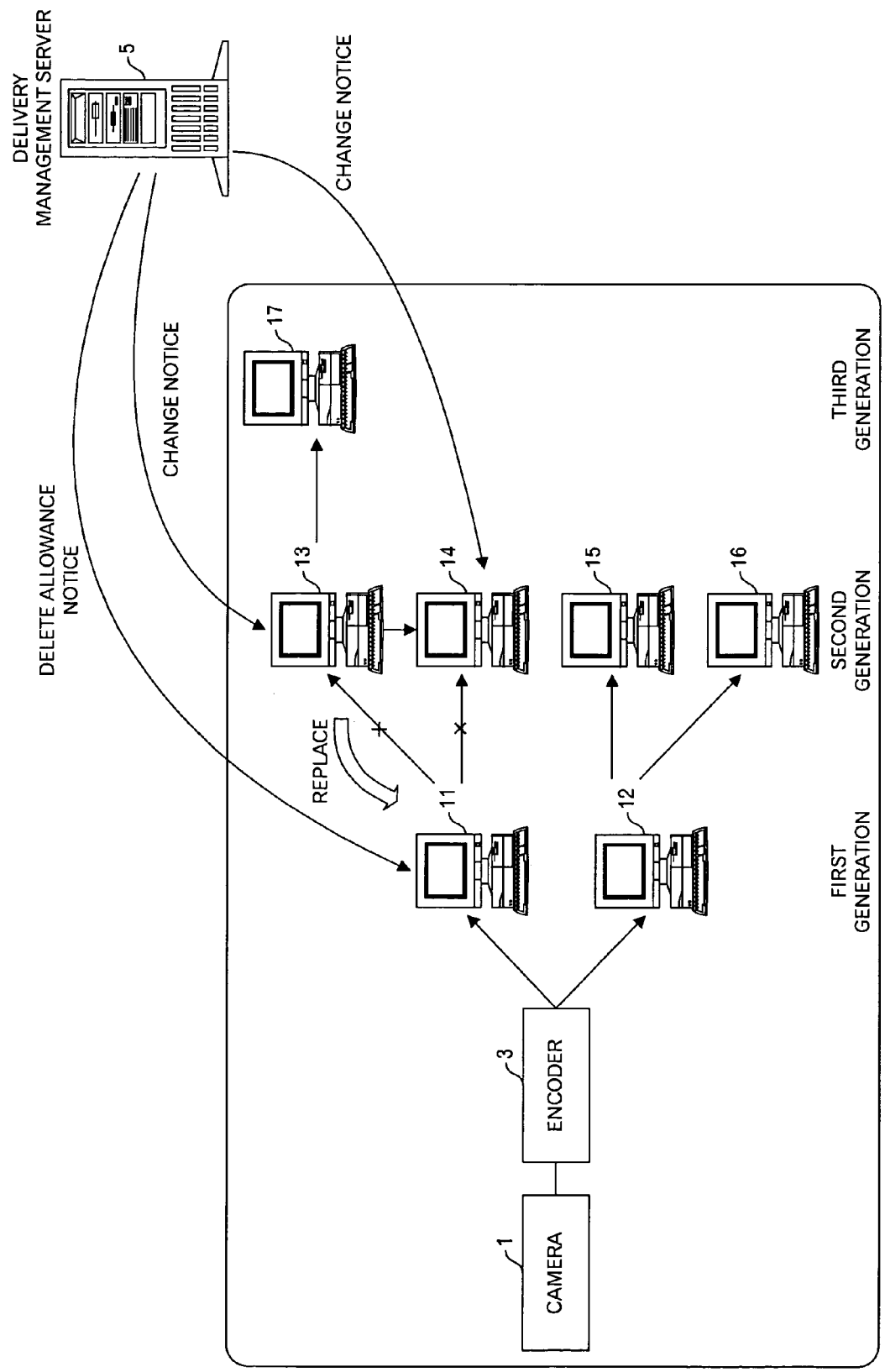
FIG. 8 is a diagram to explain the reconstruction processing of the delivery tree when receiving the delete notice from the terminal.

Next, an outline of a processing when a terminal belonging to the delivery tree 10 leaves from the delivery tree 10 will be described with reference to FIG. 7 and FIG. 8. For example, in a state of the delivery tree 10 as shown in FIG. 6, when the terminal 11 transmits a delete notice to the delivery management server 5 to leave from the delivery tree 10, the delivery management server 5 identifies the terminals 13 and 14 that receives the stream data from the terminal 11. Then, as for each of the terminals 13 and 14, while assuming the terminal 13 does not exist, the delivery management server 5 searches the delivery management DB 51 to identify a terminal whose number of generations is the least and which has any remaining delivery resource. Specifically, the encoder 3 is identified for the terminal 13 and the terminal 13 is identified for the terminal 14. Therefore, as shown in FIG. 8, the delivery management server 5 transmits a delete allowance notice to the terminal 11, transmits a change notice including the IP address and port number of the encoder 13 to the terminal 13, and transmits a change notice including the IP address and port number of the terminal 13 to the terminal 14. Then, the terminal 13 on behalf of the terminal 11 relays the stream data to the terminals 17 and 14.

When the terminal 17 leaves from the delivery tree 10, because there is no terminal that receives the stream data from the terminal 17, the delivery management server 5 only transmits the delete allowance notice to the terminal 17.

By carrying out such a processing, even when a terminal that is a node of the delivery tree 10, which is not a leaf, leaves from the delivery tree 10, it is possible to continue the delivery of the stream data while suppressing the influence to other terminals to the minimum.

Figure 9:
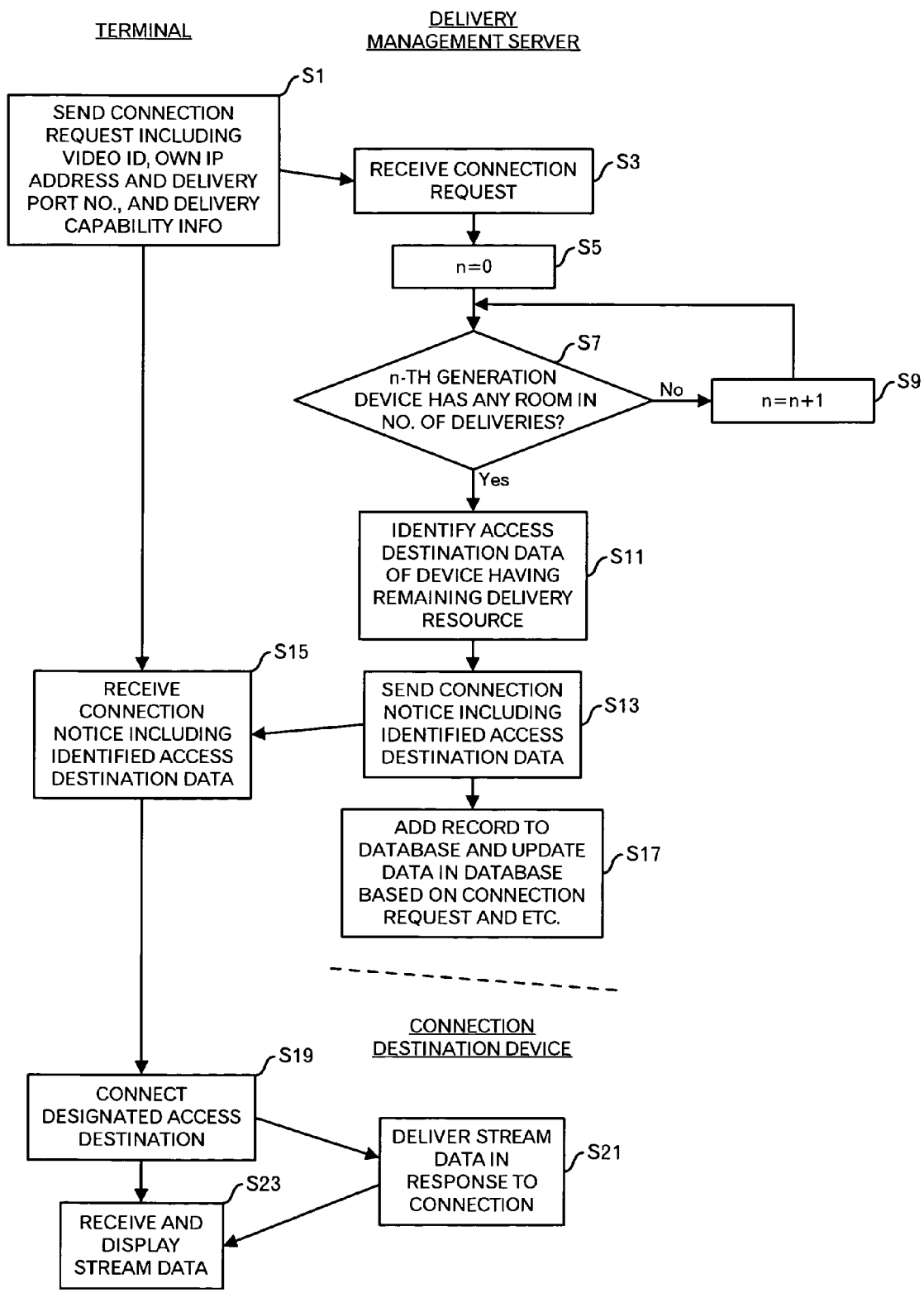
FIG. 9 is a diagram showing a processing flow when receiving the delivery request.

Next, the details of the aforementioned processing will be described with reference to FIG. 9 and FIG. 10. For example, when a user of a terminal instructs the terminal to receive specific stream data, the delivery management server interface unit 114 of the terminal accepts the instruction, obtains a device ID of this terminal, an ID of the specific stream data (here, video ID), an IP address of this terminal, a port number used for the delivery from this terminal, and delivery capability information (here, the number of terminals to which this terminal can deliver the stream data (that is, the permissible number of delivery destinations)) to transmits a connection request including these to the delivery management server 5 (step S1). As for the delivery capability information, when the delivery management server interface unit 114 at the terminal side determines the permissible number of delivery destinations, it is determined from, for example, a CPU utilization ratio, upstream bandwidth of the network, or the like. However, a value input by the user of the terminal may be used. Moreover, when the permissible number of delivery destinations is not determined at the terminal side, the terminal transmits data such as the CPU utilization ratio as the delivery capability information to the delivery management server 5.

When the delivery management server 5 receives the connection request (also called a delivery request) including the device ID of the terminal, the video ID of the specific stream data, the IP address and port number of the terminal and the delivery capability information from the terminal (step S3), it initializes the number n of generations (stages or layers) to "0" (step S5). Then, it judges whether or not the n-th generation device or devices have any room in the number of deliveries, by referring to the delivery management DB 51 (step S7). An example of data stored in the delivery management DB 51 is shown in FIG. 10.

In the example of FIG. 10, a device ID, a video ID, the number of generations, an IP address, a delivery port, the upper limit number of deliveries (also called the permissible number of delivery destinations), the number of deliveries, and a delivery source ID are registered for each node belonging to the delivery tree 10. In the example of FIG. 10, the root node ENC1 delivers stream data of the video ID=1 to the terminals CELL01 and CELL02. The delivery capability of the root node reaches its limit at this state. In addition, the terminal CELL01 of the first generation delivers the stream data of the video ID=1 to the terminals CELL03 and CELL04 by using two among four of the upper limit number of deliveries. The terminal CELL02 of the first generation delivers the stream data of the video ID=1 to the terminal CELL11 by using one among four of the upper limit number of deliveries. The terminal CELL03 of the second generation delivers the stream data of the video ID=1 to two terminals not shown in FIG. 10 by using two among two of the upper limit number of deliveries. Similarly, the terminal CELL04 of the second generation delivers the stream data of the video ID=1 to one terminal not shown in FIG. 10 by using one among two of the upper limit number of deliveries. The terminal 11 of the second generation is a leaf node of the delivery tree 10 at this time because any of two of the upper limit number of deliveries is not used. By referring to the delivery management DB 51, the delivery management server 5 judges whether or not any device whose number of deliveries does not reach the upper limit number of deliveries exists among the devices of the n-th generation.

When there is no device whose number of deliveries does not reach the upper limit number of deliveries among the devices of the n-th generation, the delivery management server 5 increments the number n of generations by "1" (step S9), and the processing returns to the step S7. On the other hand, when there is a device whose number of deliveries does not reach the upper limit number of deliveries among the devices of the n-th generation, the delivery management server 5 selects one device whose remaining delivery resources (e.g. (the upper limit number of deliveries)–(the number of deliveries)) is the most, for example, or one specific apparatus based on the device ID or the like when the remaining delivery resources are the same, and reads out the IP address and port number of the selected device as the access destination data from the delivery management DB 51 (step S11). of course, the device ID of the selected apparatus is also identified. For example, when the stream data of the video ID=1 is requested, the terminal CELL02 is selected in the example of FIG. 10, and the IP address 192.168.1.102 and the delivery port number 9900 of the terminal CELL02 are identified as the access destination data. Then, the delivery management server 5 transmits the connection notice including the identified access destination data to the requesting source terminal (step S13).

The delivery management server interface unit 114 of the requesting source terminal receives the connection notice including the IP address and port number as the access destination data from the delivery management server 5, and stores it into a storage device such as a main memory (step S15).

In addition, the delivery management server 5 updates data in the delivery management DB 51 so as to add a record for the requesting source terminal to the delivery management DB 51, and so as to increment the number of deliveries in the record for the device identified as the delivery source by using the connection request including the video ID of the specific stream data, the IP address and port number and the upper limit number of deliveries (i.e. the permissible number of delivery destinations) and the ID of the device identified as the delivery source (step S17). For example, a record for the requesting source, which includes the device ID of "CELL12", the video ID of "1", the IP address of "192.168.1.112", the delivery port number of "9900", the upper limit number of deliveries of "2", the number of deliveries of "0", and the delivery source ID of "CELL02" is added to the delivery management DB 51. In addition, in the record for the terminal "CELL02", the number of deliveries is incremented from "1" to "2". As for the upper limit number of deliveries, when receiving the delivery capability information such as the CPU utilization ratio, the delivery management server 5 determines it based on a predetermined rule.

The delivery management server interface unit 114 of the requesting source terminal outputs the access destination data to the stream data receiver 111, and the stream data receiver 111 transmits a connection request to the device of the access destination designated by the access destination data (step S19). The stream data relay unit 112 of the connection destination device (when it is the terminal) connects with the requesting source terminal according to the connection request from the terminal, and receives the stream data from the stream data receiver 111 to start the delivery of the stream data (step S21). The stream data receiver 111 of the requesting source device receives the stream data from the connection destination device, outputs it to the stream data reproduction unit 113, and the stream data reproduction unit 113 decodes the stream data to carry out an output processing such as displaying the video or the like on the display device (step S23). Incidentally, when the connection destination apparatus is the encoder 3, the delivery unit thereof carries out the connection and delivery.

By carrying out such a processing, a new terminal is arranged at a position where there is a room for the delivery in the delivery tree 10 and the number of generations (layers or stages) is the least, and more stable delivery can be achieved.

Figure 11:
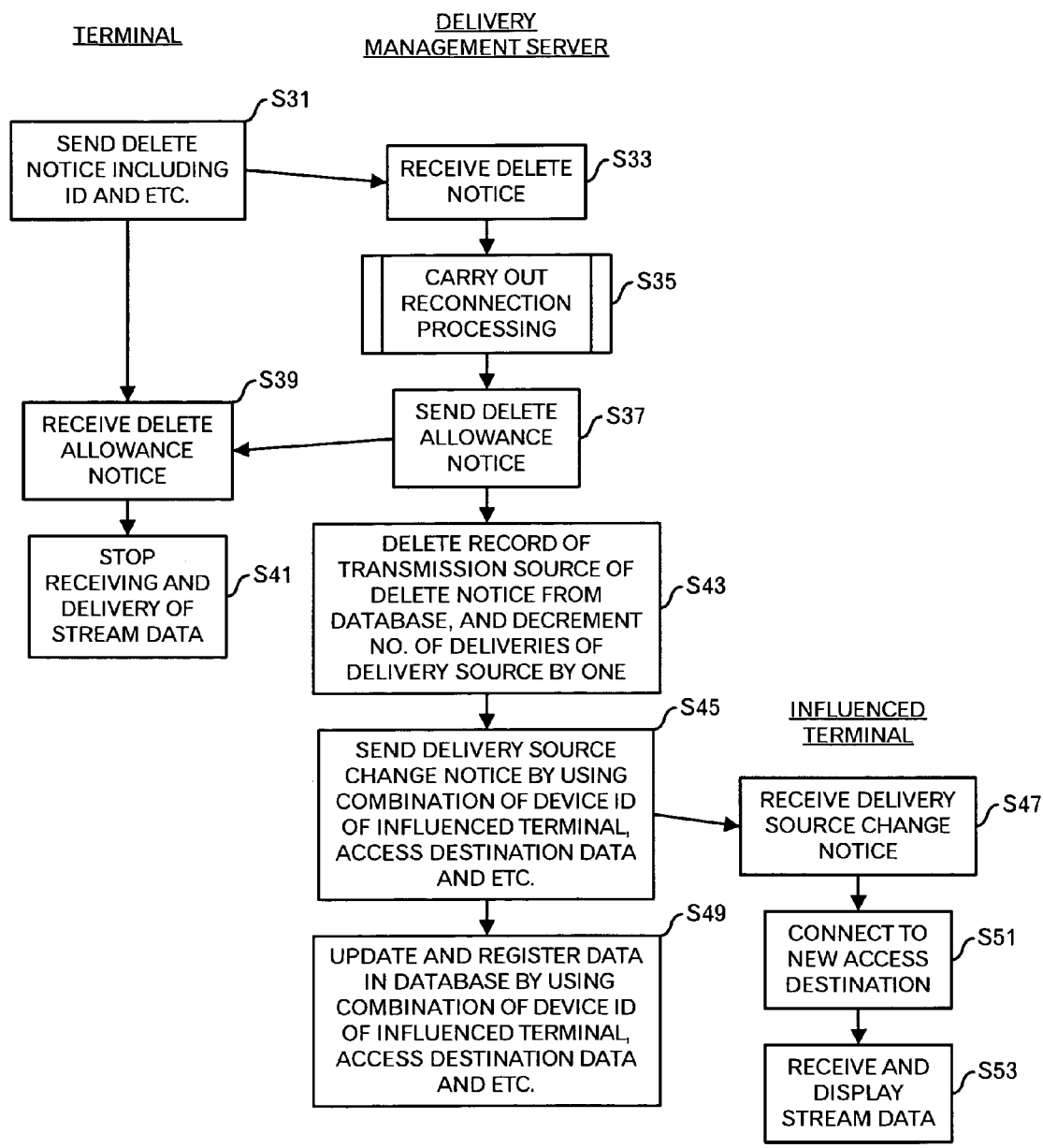
FIG. 11 is a diagram showing a processing flow when receiving the delete notice.
Figure 12:
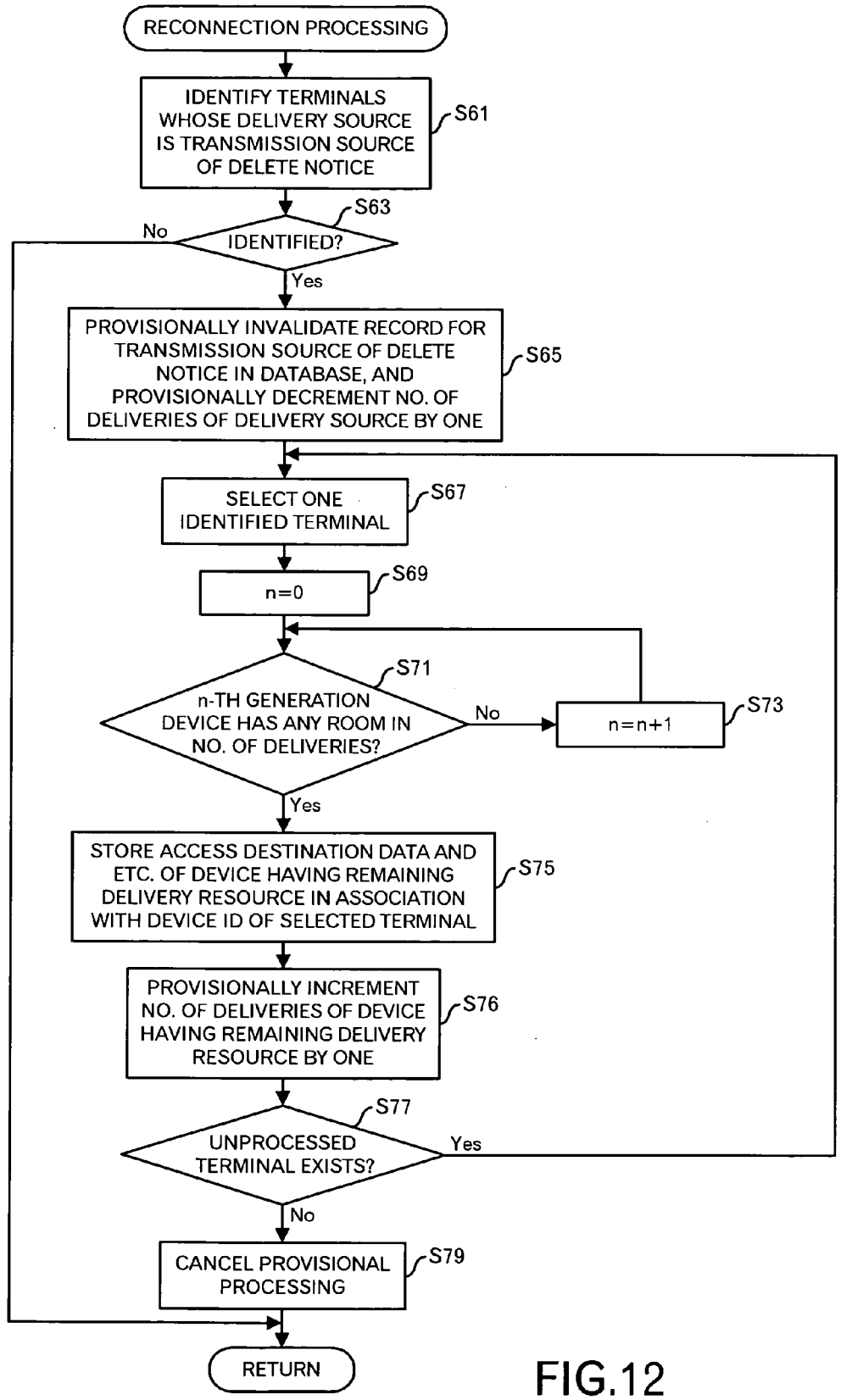
FIG. 12 is a diagram showing a processing flow of a reconnection processing.

Next, the detailed processing when a certain terminal leaves from the delivery tree 10 will be explained with reference to FIG. 11 and FIG. 12. For example, when a user of a terminal instructs the terminal to stop the receipt of the stream data, the delivery management server interface unit 114 of the terminal accepts the instruction to transmit a delete notice including the terminal ID and the like to the delivery management server 5 (FIG. 11: step S31).

When the delivery management server 5 receives the delete notice including the terminal ID and the like from the certain terminal (step S33), the delivery management server 5 carries out a reconnection processing (step S35). The reconnection processing will be explained with reference to FIG. 12.

First, the delivery management server 5 searches the delivery management DB 51 to identify terminals whose delivery source is the transmission source of the delete notice (step S61). The device IDs of the records in which the device ID of the transmission source of the delete notice is registered in the column of the delivery source ID in the table as shown in FIG. 10 are identified. When no terminal is identified in the step S61, the terminal of the delete notice is a leaf node. Therefore, when the certain terminal leaves from the delivery tree 10, there is no influence to other terminals. Therefore, the processing returns to the original processing. However, processings subsequent to step S45 are not carried out.

On the other hand, when one or plural terminal IDs are identified, the delivery management server 5 provisionally invalidates the record relating to the terminal of the transmission source of the delete notice and provisionally decrements the number of deliveries for the device that delivers the stream data to the device of the transmission source of the delete notice by "1" (step S65). That is, it provisionally assumes a state immediately after the transmission source of the delete notice has left from the delivery tree 10. For example, when the terminal CELL01 leaves from the delivery tree 10 in the example of FIG. 10, the terminals CELL03 and CELL04 are identified in the step S61. Then, the record for the terminal CELL01 is provisionally invalidated and the number of deliveries for the root node ENC1, which is the apparatus delivering to the terminal CELL01, is provisionally decremented by "1" to obtain the number of deliveries as "1".

Then, the delivery management server 5 selects one terminal of the terminals identified in the step S61 (step S67). For example, a terminal is selected in descending order of the number of deliveries of the terminal. This enables the terminal, which delivers the stream data to more terminals, to be rearranged to a position where more stable delivery can be carried out. Therefore, as a whole, the stability of the delivery can be enhanced. However, the terminal may be selected according to other rules.

Then, the delivery management server 5 initializes the number n of generations (stages or layers) to "0" (step S69). After that, it judges whether or not the n-th generation device or devices have any room in the number of deliveries, by referring to the delivery management DB 51 (step S71). This is the same processing as in the step S7.

When the number of deliveries for all the n-th generation devices reaches the upper limit number of deliveries, the number n of generations is incremented by "1" to return to the step S71 (step S73). On the other hand, when there is a device whose number of deliveries does not reach the upper limit number of deliveries, among the n-th generation devices, the delivery management server 5 select one specific device whose remaining delivery resources (e.g. (the upper limit number of deliveries)−(the number of deliveries)) is the most, for example, or one specific device based on the device ID or the like when the remaining delivery resources are the same, and reads out the device ID of the selected device and the IP address and port number of the selected device as the access destination data from the delivery management DB 51 to store them into a storage device such as a main memory in association with the device ID of the terminal selected in the step S67 (step S75). For example, when the terminal CELL01 leaves from the delivery tree 10 in the example of FIG. 10, the terminals CELL03 and CELL04 are identified in the step S61, and when the terminal CELL03 is selected in the step S67, the root node ENC1 of the 0-th generation, which comes to have the remaining delivery resource, is identified in the step S75. Therefore, the access destination data including the IP address (192.1.1.11) and the delivery port number (9900) of the root node ENC1, and ENC1 as the device ID of the root node ENC1 are stored in association with the CELL03.

Then, the delivery management server 5 provisionally increments the number of deliveries of the device identified in the step S75 by "1" (step S76). This is because plural terminals, which are assumed to be influenced, are identified in the step S61.

Then, the delivery management server 5 judges whether or not unprocessed terminal exists among the terminals identified in the step S61 (step S77). When there is an unprocessed terminal, the processing returns to the step S67. For example, as a processing subsequent to the aforementioned example, when the terminal CELL04 is selected in the step S67, the terminal CELL02 of the first generation, which has remaining delivery resources, is identified in the step S75. Then, the access destination data including the IP address (192.168.1.102) and the port number (9900) of the terminal CELL02 and CELL02 as the device ID of the terminal are stored in association with CELL04.

On the other hand, when it is judges in the step S77 that all the terminals identified in the step S61 have been processed, the delivery management server 5 cancels all of the provisional registration against the delivery management DB 51 in the steps S65 and S76 (step S79). Then, the processing returns to the original processing.

By carrying out such a processing, a new connection destination is identified for each terminal, which will be influenced when the terminal of the transmission source of the delete notice leaves from the delivery tree 10. As for the new connection destination, because it assumes a state where the terminal of the transmission source of the delete notice has left and the device, which is as close as possible to the root node, is determined, it is possible to reconstruct the reasonable delivery tree 10 by decreasing the number of generations (layers or stages).

Returning to the explanation of FIG. 11, first, the delivery management server 5 transmits a delete allowance notice to the terminal of the transmission source of the delete notice (step S37). When the delivery management server interface unit 114 of the terminal of the transmission source of the delete notice receives the delete allowance notice from the delivery management server 5 (step S39), it causes the stream data receiver 111 to stop the receipt of the stream data, and causes the stream data relay unit 112 to stop the delivery when it delivers to the lower generation terminal (step S41).

The delivery management server 5 deletes the record relating to the terminal of the transmission source of the delete notice from the delivery management DB 51 and decrements the number of deliveries in the record of the delivery source device, which delivered the stream data to the terminal of the transmission source of the delete notice by "1" (step S43). By this step, it is possible to reflect only a state where the terminal of the transmission source of the delete notice left from the delivery tree 10 to the delivery management DB 51 (step S51). In the aforementioned example, the record of CELL01 is deleted, and in the record of the root node ENC1, the number of deliveries is decremented by "1".

Furthermore, the delivery management server 5 transmits a delivery source change notice by using a combination (that is, data generated in the step 75) of the device ID of the influenced terminal, the access destination data, and the device ID of the new delivery source device, which were identified in the step S61 (step S45). When the plural terminals were identified in the step S61, the step S45 is carried out for all the terminals. When the delivery management DB 51 is searched by the device ID of the influenced terminal to identify the IP address, the delivery source change notice including the access destination data stored in association with the device ID of the influenced terminal is transmitted to the identified IP address. In the aforementioned example, as for the terminal CELL03, the delivery source change notice including the IP address (192.168.1.11) and the port number (9900) of the root node ENC1 as the access destination data is transmitted to the IP address (192.168.1.103) of the terminal CELL03. As for the terminal CELL04, the delivery source change notice including the IP address (192.168.1.102) and the delivery port number (9900) of the terminal CELL02 as the access destination data is transmitted to the IP address (192.168.1.104) of the terminal CELL04.

When the delivery management server interface unit 114 of the influenced terminal receives the delivery source change notice including the access destination data of the new delivery source device from the delivery management server 5 (step S47), it outputs data of the delivery source change notice to the stream data receiver 111. Then, the stream data receiver 111 connects to the new access destination by using the designated access destination data (step S51), receives the stream data from the new access destination device, and outputs the received stream data to the stream data reproduction unit 113 and the stream data relay unit 112. The stream data reproduction unit 113 decodes the stream data to output the decoded stream data to the output device such as the display device (step S53). The stream data relay unit 112 transfers the received stream data to its own delivery destination terminals.

In addition, the delivery management server 5 updates and registers associated records in the delivery management DB 51 by using the data generated in the step S75 (the combinations of the device ID of the influenced terminal, the access destination data, and the device ID of the new delivery source) (step S49). Specifically, the delivery management DB 51 is searched by the device ID of the influenced terminal to update and register the device ID of the new delivery source device as the delivery source ID in the identified record. Furthermore, the delivery management DB 51 is searched by the device ID of the new delivery source device to update and register the number of deliveries in the identified record by incrementing it by "1". When there are plural sets of data generated in the step S75, the data for all the sets is used.

In the aforementioned example, in the record for the terminal CELL03, ENC1 is registered as the delivery source ID, and in the record for ENC1, the number of deliveries is incremented by "1". In addition, in the record for the terminal CELL04, CELL02 is registered as the delivery source ID, and in the record for CELL02, the number of deliveries is incremented by "1".

By carrying out the aforementioned processing, even if the terminal belonging to the delivery tree 10 leaves from the delivery tree 10, it becomes possible to appropriately reconstruct the delivery tree 10. Therefore, the stream data is continuously flowing down in the delivery tree 10 without making pauses of the video or the like by additionally arranging the switching timing or using other techniques.

Although one embodiment of the present invention is explained, the present invention is not limited to this. For example, the functional blocks as shown in FIG. 2 are mere examples, and they do not necessarily correspond to actual program modules.

In addition, the upper limit number of deliveries varies for each terminal, and the upper limit number of deliveries is not always the same as those for all the terminals. However, when the upper limit number of deliveries becomes "0", the branch of the delivery tree 10 is cut off. Therefore, it is possible to refuse the connection request from such a terminal. Furthermore, the load state of the terminal varies while receiving the stream data. Therefore, it is possible to change the upper limit number of deliveries upon confirming the state of the terminal, periodically, for example. When the number of deliveries, which exceeds the new upper limit number of deliveries, is registered because the upper limit number of deliveries is decreased, it is possible to cope with this case by carrying out the processing to switch the delivery source of the terminals, which are selected due to the overflow of the new upper limit number of deliveries, as if the connection requests are newly received from them.

Furthermore, there is a case where the hang-up may happen in the relay because the reliability of the terminal is lower than that of the server. For that reason, as for the terminals of the second and subsequent generations, it is possible to request the access destination data of other delivery source terminals to the delivery management server 5 when the receiving quality of the stream data becomes equal to or less than a predetermined level, and to switch the delivery source terminal early. In addition, as for the access destination data of other delivery source terminals, the provisional reservation may be carried out to obtain it previously.

Figure 13:
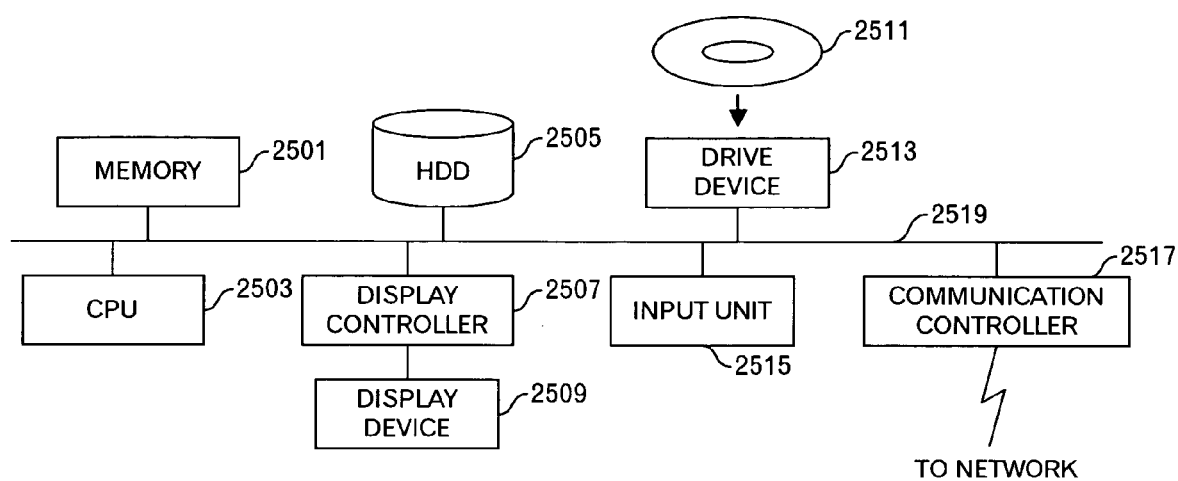
FIG. 13 is a functional diagram of a computer.

In addition, the delivery management server 5 and terminals 11 to 24 are computer devices as shown in FIG. 13. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized. Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for managing delivery of stream data, comprising:

receiving a delivery stop request from a first node in a delivery tree of stream data;

detecting a second node that receives said stream data from said first node, with reference to a delivery management database storing the number of nodes from a root node of a delivery tree of said stream data, data representing a remaining delivery resource, an access destination address and identification information of a delivery source node, for each node in said delivery tree of said stream data;

upon the detection of said second node, searching said delivery management database while assuming a state where said first node does not belong to said delivery tree, to identify a third node whose number of nodes from said root node of said delivery tree of said stream data is minimum from among nodes whose remaining delivery resource does not reach an upper limit;

after said searching, deleting data concerning said first node from said delivery management database;

after said searching, transmitting a delivery stop allowance notice to said first node;

reading out an access destination address of said third node from said delivery management database, and transmitting the read access destination address to said second node; and updating said delivery management database so as to reflect a state where said stream data is being delivered from said third node to said second node.

2. A non-transitory computer-readable storage medium storing a program for causing a computer to execute a process of delivery management of stream data, said process comprising:

receiving a delivery stop request from a first node in a delivery tree of stream data;

detecting a second node that receives said stream data from said first node, with reference to a delivery management database storing the number of nodes from a root node of a delivery tree of said stream data, data representing a remaining delivery resource, an access destination address and identification information of a delivery source node, for each node in said delivery tree of said stream data;

upon the detection of said second node, searching said delivery management database while assuming a state where said first node does not belong to said delivery tree, to identify a third node whose number of nodes from said root node of said delivery tree of said stream data is minimum from among nodes whose remaining relay resource does not reach an upper limit;

after said searching, deleting data concerning said first node from said delivery management database;

after said searching, transmitting a delivery stop allowance notice to said first node;

reading out an access destination address of said third node from said delivery management database, and transmitting the read access destination address to said second node; and updating said delivery management database so as to reflect a state where said stream data is being delivered from said third node to said second node.

3. An apparatus for managing delivery of stream data, comprising:

a unit to receive a delivery stop request from a first node in a delivery tree of stream data;

a unit to detect a second node that receives said stream data from said first node with reference to a delivery management database storing the number of nodes from a root node of a delivery tree of said stream data, data representing a remaining delivery resource, an access destination address and identification information of a delivery source node, for each node in said delivery tree of said stream data;

a search unit to search, upon the detection of said second node, said delivery management database while assuming a state where said first node does not belong to said delivery tree, to identify a third node whose number of nodes from said root node of said delivery tree of said stream data is minimum from among nodes whose remaining delivery resource does not reach an upper limit;

a unit to delete data concerning said first node from said delivery management database, after said search unit operated;

a unit to transmit a delivery stop allowance notice to said first node, after said search unit operated;

a unit to read out an access destination address of said third node from said delivery management database, and to transmit the read access destination address to said second node; and a unit to update said delivery management database so as to reflect a state where said stream data is being delivered from said third node to said second node.

4. The method as set forth in claim 1, wherein said first node continues transmission of said stream data at least until said searching is completed.

* * * * *